United States Patent [19]
Shellhause

[11] 3,839,867
[45] Oct. 8, 1974

[54] MASTER CYLINDER
[75] Inventor: Ronald L. Shellhause, Vandalia, Ohio
[73] Assignee: General Motors Corporation, Detroit, Mich.
[22] Filed: Aug. 24, 1973
[21] Appl. No.: 391,215

[52] U.S. Cl. .................................. 60/562, 403/329
[51] Int. Cl. ............................................. F15b 7/08
[58] Field of Search ...... 60/562, 581; 403/364, 326, 403/329

[56] References Cited
UNITED STATES PATENTS

| | | | |
|---|---|---|---|
| 2,974,492 | 3/1961 | Gilovich | 91/167 |
| 3,242,820 | 3/1966 | Brandstadter | 91/167 |
| 3,373,397 | 3/1968 | Renshaw | 403/364 |
| 3,423,939 | 1/1969 | Lewis et al. | 60/562 |

FOREIGN PATENTS OR APPLICATIONS

| 1,011,272 | 0/1965 | Great Britain | 60/562 |
|---|---|---|---|

Primary Examiner—Irwin C. Cohen
Assistant Examiner—A. M. Zupcic
Attorney, Agent, or Firm—D. D. McGraw

[57] ABSTRACT

A master cylinder for a brake system in which two pistons positioned in a single bore act on fluid in two pressurizing chambers. The piston return springs in the chambers are preloaded to position the pistons against a piston stop when the master cylinder is released. The spring having the heavier preload is provided with a caging mechanism which limits its extention and thereby establishes the precise distance between the pistons when the master cylinder is in the release position. The caging mechanism includes a pair of cooperative hook-end members which may be snapped into position during installation and which have abuttable surfaces to control the maximum and minimum distances obtainable between the pistons.

2 Claims, 1 Drawing Figure

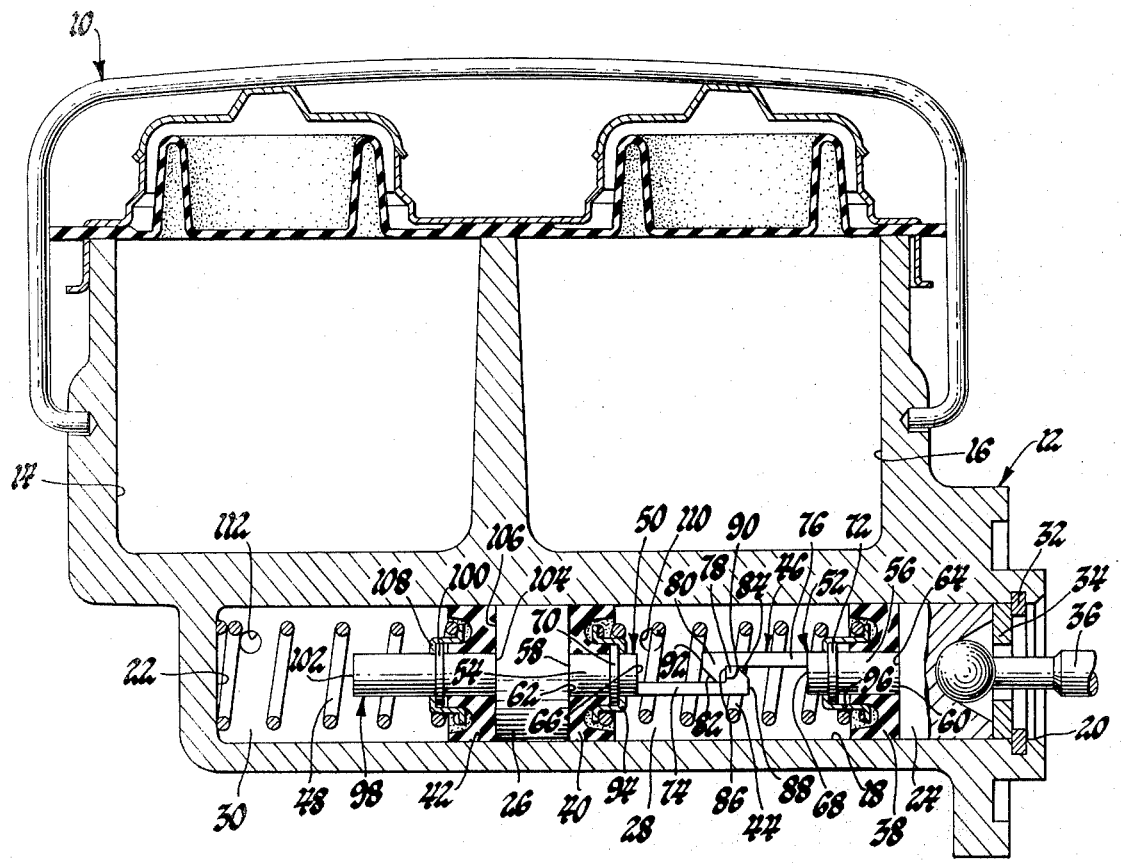

MASTER CYLINDER

The invention relates to a master cylinder assembly and more particularly to the dual chamber type in which one of the piston return springs is caged to provide precise positioning of the pistons during brake release, the caging mechanism also providing a mechanical force path from the first piston to the second piston when fluid is not pressurized in the chamber between the pistons during brake actuation. The caging mechanism includes two substantially identical caging members which have cooperating hook-ends permitting easy installation and, once installed, defining by abuttable surfaces the maximum and minimum distances allowed between the pistons.

In the drawing the single FIGURE is a cross section view with parts broken away and showing a master cylinder assembly embodying the invention.

The master cylinder assembly 10 has a housing 12 formed to provide reservoir chambers 14 and 16 and a bore 18. The bord has an open end 20 and a closed end 22. Primary pressurizing piston 24 and secondary pressurizing piston 26 are reciprocably received in bore 18. A primary pressurizing chamber 28 is defined by the bore and the pistons 24 and 26. A secondary pressurizing chamber 30 is defined by the secondary piston 26 and the portion of bore 18 adjacent the bore end 22. A piston stop 32 in the open end 20 of the bore cooperates with a washer 34 against which the rear end of the primary piston may rest to provide a piston stop arrangement which positions the pistons when the brakes are released. Push rod 36 extends through stop 32 and washer 34 and is connected with piston 24 so that movement of the push rod in one direction will actuate the master cylinder to pressurize fluid in the pressurizing chambers 28 and 30. Primary cup or seal 38 is positioned on the forward face of piston 24. Secondary cups or seals 40 and 42 are positioned on either side of piston 26. A piston return spring 44 is positioned in the primary pressurizing chamber 28 and operatively acts on pistons 24 and 26 through a spring caging mechanism 46. A secondary piston return spring 48 is located in secondary pressurizing chamber 30 and operatively engages the bore end 22 and the secondary piston 26. Both piston return springs are preferably preloaded in compression when the pistons are in the brake release position shown in FIG. 1, with the primary piston return spring 44 having the greater preload. Thus when the master cylinder is in the brake release position the caging mechanism 46 establishes the precise distance that the pistons 24 and 26 are spaced apart by the spring 44, spring 48 urging the secondary piston 26 to this position.

The caging mechanism 46 includes two substantially identically constructed caging members 50 and 52. These members have body sections 54 and 56, respectively, which are positioned axially with spring 44, pistons 24 and 26, and bore 18. The body sections have outer abuttable end surfaces 58 and 60, respectively, which normally abut the adjacent faces 62 and 64 of secondary piston 26 and primary piston 24, respectively. The body surfaces have intermediate abuttable surfaces 66 and 68 and flanges 70 and 72, respectively, the flanges being positioned intermediate the abuttable end surfaces of each body section. The portion of each body section between each flange and its outer end surface is received through the annular cup or seal associated therewith. Thus body section 54 is received through secondary cup 40 and body section 56 is received through primary cup 38. The caging members 50 and 52 are respectively provided with caging arms 74 and 76 which extend axially parallel to the axes of the body sections, but are laterally spaced therefrom. These arms are springy for ease of installation as described below. The arms respectively terminate in hook-ends 78 and 80 which extend laterally to intersect the axes of the body sections. The hook-ends respectively have beveled outer surfaces 82 and 84 and axially spaced abuttable end surfaces 86, 88 and 90, 92. These end surfaces are parallel to the abuttable intermediate surfaces 66 and 68 of the body sections. Spring seats and retainers 94 and 96 are respectively received about the body sections 54 and 56 so that they engage flanges 70 and 72 on the sides thereof adjacent the surfaces 67 and 68. The spring seats and retainers are constructed to receive the opposite ends of spring 44.

A similar spring seating and retaining arrangement is provided in secondary spring 48 in chamber 30. In this instance a plug 98 is constructed similar to the body section of one of the caging members, the plug having a flange 100 positioned between abuttable end surfaces 102 and 104. The plug extends through the secondary cup 32 so that its end surface 104 abuts the face 106 of piston 26. The portion of plug 98 extending from flange 100 toward bore end 22 is of a length to permit the plug end surface 22 to engage the bore end 22 upon sufficient movement of piston 26 in the bore. The spring seat and retainer 108 is received on plug 98 and engages flange 100 and one end of secondary spring 48. Thus the spring 48 acts on piston 26 through the seat and retainer 108 and plug 98.

Ports 110 and 112 are provided through the housing to communicate with the pressurizing chambers 28 and 30, respectively. These ports lead to compensating port controlling valve members and the conduits of the brake circuits.

During initial installation of the pistons and springs, the secondary piston, together with its cups 40 and 42, plug 98, retainer 108, and spring 106, may be inserted in the bore, end caging member 50 and retainer 94 positioned relative to the piston 26 and cup 40. Spring 44 may be then placed in the bore so thax its seats on spring seat and retainer 94. The caging member 52, the spring seat and retainer 96, the cup 38, and piston 24 are then inserted in the bore with the end of spring 44 being guided toward the seat and retainer 96. As the last inserted elements are moved forward in the bore, beveled surface 82 of arm 76 engages beveled surface 84 of arm 74 in camming relation, causing the arms to flex in spring-like cantilever fashion so that the hooked-end 78 passes over the hooked-end 80 and these ends snap together into the position in FIG. 1. The preload on spring 44 maintained by this position holds the hook-end surfaces 86 and 90 in abutting engagement so that the hook-ends prevent the caging members from moving axially apart. This establishes the precise distance between the abutting surfaces 58 and 60 of the two caging members. Pistons 26 and 24 are respectively engaged with these surfaces due to the preload on spring 48 and the abuttable engagement of piston 24 with washer 34, which in turn is in engagement with stop 32, and are therefore precisely positioned. When the master cylinder is actuated to pressurize fluid in chambers 28 and 30, piston 24 and cup 38 move toward bore end 22, moving caging member 52 and spring seat and retainer 96 with it. This tends to compress spring 44 while at the samd time generating a pressure in chamber 28. Both forces act on piston 26 through cup 40 and spring seat and retainer 94 and caging member 50 to move piston 26 toward bore end 22. This causes pressurization of fluid in chamber 30 and spring 48 is compressed. The pressurized fluid in each chamber flows out of ports 110 and 112, respectively, toward the brakes being actuated.

It is claimed:

1. In a dual master cylinder having:

a housing having a bore therein with a piston stop in the open end, the other bore end being closed;

first and second pistons having piston cups and reciprocably received in said bore and defining therewith a first pressurizing chamber between said pistons and a second pressurizing chamber between said second piston and the bore closed end, and first and second piston return springs respectively received in said pressurizing chambers, said first spring acting between said pistons with a preload greater than the compression preload of said second spring which acts between said second piston and the closed bore end;

and caging means in said first pressurizing chamber for said first spring;

the improvement in said caging means comprising:

first and second caging members each formed with an abutting end extending axially through an adjacent piston cup and abutting the piston associated therewith, and a flange on each abutting end adjacent the piston cup;

a spring seat and retainer for each caging member abutting the flange thereof and receiving an end of said first spring so that the compression preload of said first spring urges said caging members and therefore said pistons axially apart;

said caging members each further having an axially extending offset cantilever spring arm extending in the opposite direction from the piston associated therewith and terminating in an end-beveled hook with the arm and hook of one caging member mating with the arm and hook of the other caging member during installation to laterally deflect said hooks by camming action of said end-beveled hooks and the cantilever spring characteristics of said arms and thereafter acting to limit the maximum distance that the flanged abutting ends and therefore the pistons may be moved apart by said first spring, each of said hooks also being axially engageable in abutting relation with a complementary surface of the other caging member adjacent said flange to limit the amount of relative movement of said first piston toward said second piston.

2. A dual master cylinder primary caged spring mechanism comprising:

a primary caged spring which is a compressively preloaded coil spring;

first and second caging members each having an axially extending body section coaxially positioned relative to the primary spring being caged with said body section having an abuttable end surface and an abuttable intermediate surface and a flange spaced axially between said surfaces, a cantilever spring defining an arm extending from said body intermediate surface axially parallel to but laterally spaced from the body section axis and terminating in a hook-end having a beveled outer surface and axially spaced abuttable end surfaces substantially parallel to said abuttable intermediate surface, said beveled outer surface and said last named abuttable end surfaces extending through the body section axis;

and first and second primary spring seats and retainers fitting over said caging member body sections against said flanges and receiving the ends of said primary spring;

said first and second caging members being positioned in coaxial reverse relation to each other and during installation having said beveled outer surfaces engaging in camming relation to flex said cantilever springs laterally to snap said hook-ends together whereby their adjacent end surfaces are in abutting relation to limit the maximum diverse movement of said caging members, the other of said hook-end abuttable end surfaces engaging said body section intermediate surfaces upon compression of said primary spring to limit the amount of compression of said primary spring and the amount of relative movement of said first caging member body section toward said second caging member body section.

* * * * *